United States Patent [19]
Barrows et al.

[11] 4,090,821
[45] May 23, 1978

[54] GOVERNOR DEVICE

[75] Inventors: Robert Earl Barrows, Blue Ridge, Va.; Reginald William Pauley, Belle Meade, N.J.

[73] Assignee: Ingersoll-Rand Company, Woodcliff Lake, N.J.

[21] Appl. No.: 700,863

[22] Filed: Jun. 29, 1976

[51] Int. Cl.² .................. F01C 21/12; G05D 13/10
[52] U.S. Cl. ........................................ 418/41; 418/43; 137/56; 137/57
[58] Field of Search .................. 418/40–43; 137/53, 56, 57

[56] References Cited

U.S. PATENT DOCUMENTS

| 162,219 | 4/1875 | Chase | 137/56 |
| 2,402,972 | 7/1946 | Mitchell | 418/43 |
| 3,282,278 | 11/1966 | Kubilos | 137/56 |

FOREIGN PATENT DOCUMENTS

| 467,506 | 8/1950 | Canada | 418/41 |
| 2,257,559 | 5/1974 | Germany | 418/41 |

Primary Examiner—John J. Vrablik
Attorney, Agent, or Firm—Walter C. Vliet

[57] ABSTRACT

A governor device for rotary grinders and the like is disclosed. The device prevents the dangerous overspeed of the grinder by throttling air to the motor as the grinder speed approaches overspeed. Throttling action is accomplished by means of allowing a resilient split ring or segment to expand radially out against air inlet orifices by means of centrifugal force. The split ring is assisted outwardly by means of an auxiliary mass means disposed within radially extended slots of an internal cage means.

13 Claims, 3 Drawing Figures

U.S.Patent     May 23, 1978     4,090,821

GOVERNOR DEVICE

BACKGROUND OF THE INVENTION

In the past, flyweight centrifugal governors have been extensively used to control the speed of rotary, pneumatic, or pressure fluid driven high speed grinders and other tools. Typically, these flyweights have been revolved about a pivot point or displaced radially as the speed of the grinder increased by means of various linkage. The movement of the flyweights working against a spring as a speed reference force was converted into a movement of a valve means to modulate the supply of pressure fluid. Numerous ingenious devices have been developed to accomplish what appears to be this relatively simple task. However, unless the valve means itself was allowed to rotate, such centrifugal devices were subject to wear in use and over a period of time had a tendency to change the governor's ability to control speed. In many recent governors, the valving mechanism is allowed to rotate with the governor weights resulting in an improved mechanism. However, these devices are often cumbersome and have a valve member which may rub against a stationary part.

In addition, the above governing devices, because of the nature of their construction, are subject to seizing because of particles or moisture in the pressure fluid, mechanical linkage failure, or misalignment, any of which could result in dangerous overspeed of the grinding wheel.

SUMMARY OF THE INVENTION

The present invention utilizes a revolving cage which rotates with or in proportion to the speed of the grinder and which is disposed in the path of the pressure fluid utilized to drive a grinder motor. The object of this invention, therefore, is to provide a simple, economical, reliable, and fail-safe overspeed governor for rotary devices driven by pressure fluid. A further object of this invention is to teach a device which cannot be reassembled incorrectly and has a minimum of moving parts. It is still a further object of this invention to teach a governor device without mechanical linkage or independent valving mechanism or relative movement wear and that is not affected by dirt or moisture in the air.

The governor has a capability of speed control satisfactory for normal grinder usage and other applications where ultra precise speed control or full shut-off is not required. In general, these and other objects are achieved in a governor device comprising: An enclosure means having a pressure fluid inlet and a pressure fluid outlet, positioning means mounted within the enclosure for rotation with the enclosure; flexible sealing means disposed at least partially about the positioning means; and wherein the flexible sealing means moves by centrifugal force from a position close to the positioning means to a position close to the enclosure means whereby it closes the pressure fluid inlet to the enclosure means.

DESCRIPTION OF THE PREFERRED EMBODIMENT

Figure 1:
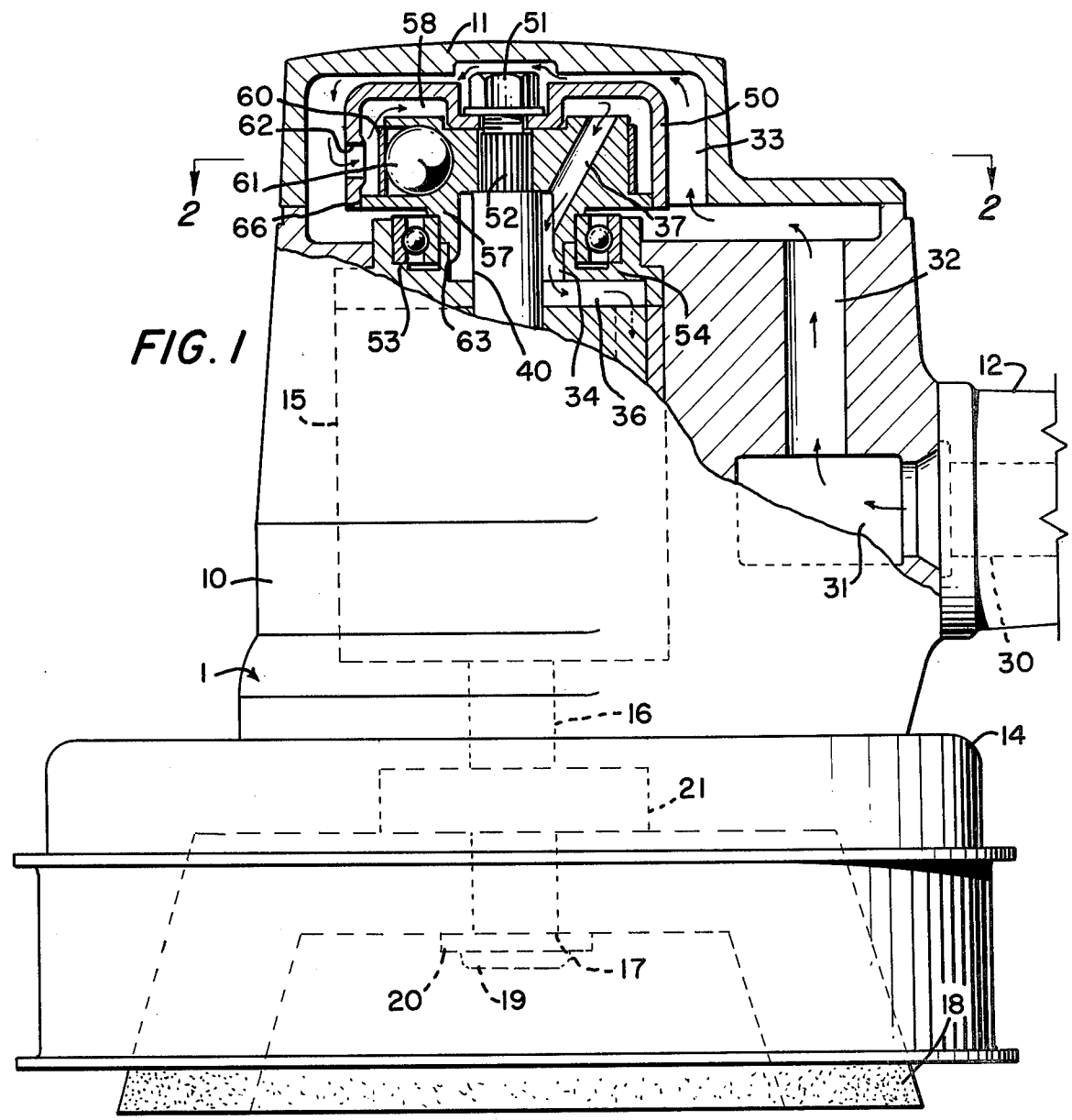
FIG. 1 is a side elevation of a rotary grinder having an overspeed governor according to this invention.

A rotary high speed grinder commonly referred to as a vertical grinder is generally designated as reference numeral 1. The grinder is provided with a housing 10, which has attached to it a top cover 11, a handle 12 (partly shown), and a wheel guard 14. The housing contains a rotary pressure fluid motor 15 (shown in an outline form), which has its power output on a spindle 16 and is adapted at its outer end to receive a grinding wheel 18. The mounting means for the grinding wheel 18 includes screw means 19, which threadably engages an output end of spindle 17 and holds in place a retaining washer 20. The retaining washer 20 secures the grinding wheel 18 against a backup flange 21, which is secured to spindle 16.

It can be appreciated that the grinding wheel may be removed and replaced by unscrewing screw means 19 removing retaining washer 20 and allowing the grinding wheel 18 to slide off the spindle. Replacement is the reverse procedure. Pressure fluid, which may be air or other compressible or incompressible pressure fluid, is supplied to the motor 15 by means of a passageway 30 extending through the handle 12. A shut-off valve (not shown) is disposed in the passageway 30 to interrupt or establish the flow of pressure fluid to the various housing passageways and eventually to the pressure fluid motor 15.

Pressure fluid is supplied to the handle by any conventional means from a suitable pressure fluid source. Pressure fluid enters the housing 10 from the handle 12 by way of inlet port 31. Pressure fluid then proceeds as shown by the flow arrows through casing passage 32 into compartment 33 formed between housing 10 and top cover 11.

A back shaft 40 extends from the motor 15 into compartment 33. A generally cylindrical enclosure 50 is disposed on back shaft 40 and retained there by means of lock nut 51. A bearing 53 is retained in the housing 10 by means of end plate 54.

A governor body 57 is mounted on the back shaft 40 and serves several functions. It is the primary means for centering the back shaft 40 and supporting it in bearing 53. In addition, it serves as a base to which cylindrical enclosure 50 is attached and as a pressure fluid distributor as will be later described. Spline 52 prevents the governor body 57 from rotating about the back shaft 40 and, therefore, the cylindrical enclosure 50 also rotates with the back shaft 40. In addition, the governer body 57 serves as the centering device or positioning means for the flexible control ring 60 and as a radial passageway guide for balls 61. It can be appreciated by one skilled in the art that if governor body 57 is omitted from the assembly that the grinder will not properly function; in that, the pressure fluid motor 15 will not have its back shaft 40 properly centered. In order to assure a tamper-proof design, the governor body 57 is an integral part of the mounting bearing for the motor back shaft 40.

The spindle 16 of the motor 15 is supported by a second bearing (not shown). However, the second bearing and bearing 53 must cooperate to properly center the motor 15 within the housing 10. While it is possible to design a second spindle bearing which would eliminate the need for bearing 53, it is felt that the bearing 53 and the necessary cooperation of governor body 57 to assure its placement is a desirable tamper-proof feature of the grinder.

Pressure fluid may enter the chamber 58 formed by the cylindrical enclosure 50 and governor body 57, by means of two orifices 62 which are located in outer sleeve 50. Pressure fluid entering the chamber 58 may next proceed out of the chamber 58 to operate fluid motor 15 by way of passageway 37 formed in the governor body, annular passageways 34 along back shaft 40, and finally through passage 36 to the motor. The path of the pressure fluid is generally indicated by the arrow path shown. Pressure fluid entering the motor through passage 36 is expanded to drive the grinder.

It can now be appreciated that for pressure fluid to enter motor 15, it must pass through chamber 58 or in some manner bypass it; for example, via leakage through bearing 53. To minimize bypass leakage, a non-contacting labyrinth seal 63 is provided between governor body 57 and end plate 54. Although for the purpose of normal grinder design a perfect seal is not required, it is felt that the leakage path in a governor should be limited to a small percentage of the total free speed pressure fluid requirement of the motor, or allowed to bleed off to exhaust so as not to drive the motor.

Figure 2:
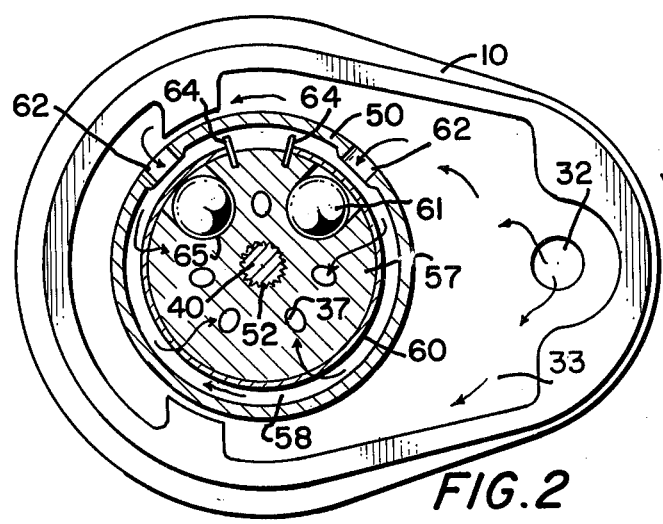
FIG. 2 is a plan section taken through the governor at section 2—2 of FIG. 1.

Referring to FIG. 2, pressure fluid enters the area surrounding the cylindrical enclosure 50, which is the governor housing, and enters the chamber 58 through orifices 62. Pressure fliud then proceeds to leave the chamber via passageway 37, 34, and 36.

Figure 3:
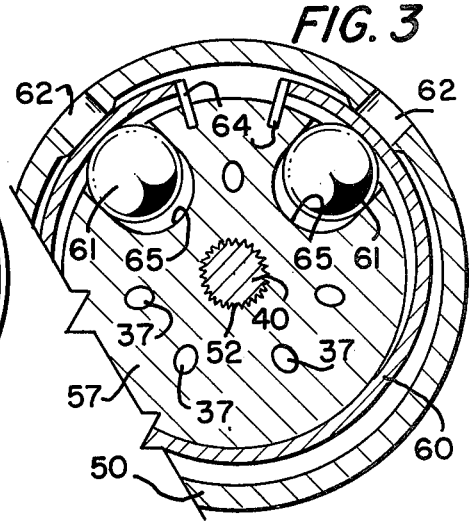
FIG. 3 is an enlarged section of the governor cage shown in FIG. 2 showing the governor in its overspeed or shut-off position.

In FIG. 2, a flexible control ring 60 is best seen disposed about guide spool 57. The control ring is split to facilitate its radial expansion and is free to revolve about governor body 57 except for the retainer guides 64 shown. The balls 61 or force means are retained in radially extending pockets 65, best seen in FIG. 3. The balls 61 are provided with sufficient clearance so that they may freely move within the pockets 65. FIG. 2 shows the position of the various governor components when the grinder is stopped or running at low speed. FIG. 3 shows the various components of the governor in position with the grinder is at maximum speed; that is, with the control ring blocking airflow, thus preventing overspeed of the grinder.

Having described the various components of the grinder and its overspeed governor, I will now proceed to describe its operation. A source of pressure fluid is applied to the internal passageway of handle 12. A shut-off valve (not shown) prevents pressure fluid from entering the remainder of the grinder. However, when it is desirable to operate the grinder, the operator depresses the shut-off valve causing pressure fluid to begin to flow to the grinder via a passageway 30, inlet port 31, casing passageway 32, compartment 33, orifice inlet 62, chamber 58, passageway 37, annular passageway 34, and finally to motor port 36 through which the pressure fluid enters the motor and is expanded to cause it to run. Rotation of the motor drives the grinding wheel and at the same time the governor (governor body 57 and cylindrical enclosure 50).

As the speed of rotation increases, one skilled in the art can appreciate that the flexible control ring or control means 60 will be forced radially outward under the influence of its own weight. In the preferred embodiment, we have chosen to utilize balls 61 or force means to increase the centrifugal effect on the ring. As seen in FIG. 3, as the flexible control ring is displaced radially by centrifugal force, it approaches the orifice 62, the control ring as it is displaced outwardly will eventually cover the orifice thus preventing the flow of pressure fluid through the orifice and hence to the motor. This action results in governing or restricting the pressure fluid flow to the motor at high speed, thus preventing overspeed. The speed at which the control ring will be forced out against the orifice 62 is controlled by the spring rate of the control ring, its weight, the weight of the balls, the diameter of the governor body, and the incoming air force. For example, governed speed will be reduced by reducing the spring force rate of the flexible control ring or increasing the weight of the balls and/or the weight of the control ring itself.

A number of unique features of the governor will now be discussed. Except for the labyrinth seal, the design of the governor presents no areas of relative wear contact. Even the labyrinth seal need not rub; in that, substantial quantities of bypassed air are permissible. The contruction of the governor and the use of the governor body as part of the back shaft centering within bearing 53 leads to a tamperproof design; in that, the governor body 57 must be in place before the grinder may be satisfactorily operated. Outer sleeve 50 is permanently attached to the governor body 57 upon assembly of the governor. The balls 61 must be inserted also at the time of assembly and cannot be removed readily after assembly. Referring to FIG. 3, it can be readily appreciated that if in the reassembly of the governor, the flexible control ring 60 is omitted, the governor will still operate but at a lower controlled speed because the balls 61 will serve to block off the orifice inlets or inlet means. This will also occur should the flexible control ring break.

Although we have described the invention fully in connection with the preferred embodiment, it should be obvious to one skilled in the art that numerous modifications are possible and that we do not wish to be limited in the scope of our invention except by the scope of the following claims.

I claim:

1. A motor and governor aparatus comprising:
   a pressure fluid motor;
   an enclosure rotating in proportion to the speed of said motor;
   said enclosure having a radial pressure fluid inlet and a pressure fluid outlet for conducting operating pressure fluid to said motor;
   positioning means mounted within said enclosure for rotation with said enclosure;
   sealing means disposed at least partially about and rotating with said positioning means;
   said sealing means moves by centrifugal force from a position close to said positioning means to a position close to said enclosure whereby it closes said pressure fluid inlet to said enclosure and obstructs the flow of pressure fluid to said motor;
   said sealing means having a relatively smooth face adapted to restrict the flow of fluid through said pressure fluid inlet when moved towards said pressure fluid inlet in a direction which presents said face generally at right angles to the flow of fluid through said pressure fluid inlet; and
   said sealing means including centrifugally-operated means operative to urge said sealing means towards said pressure fluid inlet in response to an increase in rotary speed of said enclosure.

2. The apparatus of claim 1 wherein:
   said enclosure rotates with a spindle of said motor.

3. The apparatus of claim 1 wherein:
said enclosure is provided with a bypass seal means to prevent pressure fluid bypass other than through said pressure fluid inlet to said enclosure.

4. The apparatus of claim 1 wherein:
said pressure fluid outlet leads to said motor.

5. The apparatus of claim 1 wherein:
said enclosure means is provided with inlet means which meter the flow of pressure fluid into said enclosure in cooperation with said sealing means.

6. The apparatus of claim 1 wherein:
said positioning means is mounted on a spindle of said motor means and forms a part of the centering support of said spindle.

7. The apparatus of claim 1 wherein:
said sealing means is a flexible control means.

8. The apparatus of claim 7 wherein:
said flexible control means is a split ring which is free to expand radially outwards to close said pressure fluid inlet without sliding contact relative to said positioning means or said pressure fluid inlet.

9. The apparatus of claim 7 wherein:
said flexible control means is assisted in its movement towards said enclosure by centrifugally-operated means.

10. The apparatus of claim 9 wherein:
said centrifugally-operated means cooperates with said pressure fluid inlet to meter pressure fluid into said enclosure.

11. The apparatus of claim 9 wherein:
said centrifugally-operated means is positioned in said enclosure away from the normal path of fluid flow through said enclosure between said pressure fluid inlet and said pressure fluid outlet whereby its operation is not likely to be disabled by the deposit of dirt or other debris carried by the pressure fluid passing through said enclosure.

12. The apparatus of claim 11 wherein:
said balls are disposed in radially aligned pockets in said positioning means; and
said pockets are radially aligned with said pressure fluid inlet such that in the event said sealing means cannot cover the pressure fluid inlet, said centrifugally-operated means will cooperate with said pressure fluid inlet to restrict the flow of pressure fluid in response to an increase in rotary speed of said enclosure.

13. A governor device in combination with a pressure fluid motor for a fluid power tool comprising:
a pressure fluid motor means;
a pressure fluid supply to said tool;
a drive means extending from said motor means;
a chamber enclosure disposed on said drive means;
a radial pressure fluid inlet to said enclosure;
a pressure fluid outlet from said enclosure located radially inward of said enclosure and leading to said motor means;
said chamber enclosure being located between said motor means and said pressure fluid supply whereby said pressure fluid must pass through the chamber defined by said enclosure to operate said motor means;
sealing means disposed in said chamber;
said sealing means in said enclosure positioned adjacent said pressure fluid inlet port and mounted in said enclosure to move toward and away from said pressure fluid inlet port in a direction which presents said sealing means generally at right angles to the flow of fluid through said pressure fluid inlet port, said sealing means having a relatively smooth face adapted to restrict the flow of fluid through said pressure fluid inlet port when moved toward it, said sealing means including resilient means urging said sealing means away from said pressure fluid inlet port;
said sealing means including centrifugally-operated means operative to urge said sealing means toward said pressure fluid inlet port in response to an increase in rotary speed of said enclosure; and
said centrifugally-operated means being located in said enclosure away from the normal path of fluid through said chamber between pressure fluid inlet port and said pressure fluid outlet port whereby its operation is not likely to be disabled by the deposit of dirt or other debris carried by the fluid passing through said chamber.

* * * * *